(12) United States Patent
Zhang et al.

(10) Patent No.: US 9,212,804 B2
(45) Date of Patent: Dec. 15, 2015

(54) LENS AND AN ASYMMETRICAL LIGHT DISTRIBUTION ILLUMINATING DEVICE HAVING SUCH LENS

(75) Inventors: Qihui Zhang, Shenzhen Guangdong (CN); Jing Lin, Shenzhen Guangdong (CN); Jin Hu, Shenzhen (CN); Anmiao Li, Shenzhen (CN)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/354,599

(22) PCT Filed: Sep. 13, 2012

(86) PCT No.: PCT/EP2012/067993
§ 371 (c)(1),
(2), (4) Date: Jun. 3, 2014

(87) PCT Pub. No.: WO2013/060527
PCT Pub. Date: May 2, 2013

(65) Prior Publication Data
US 2014/0286018 A1    Sep. 25, 2014

(30) Foreign Application Priority Data

Oct. 28, 2011   (CN) .......................... 2011 1 0335752

(51) Int. Cl.
| F21V 3/00 | (2015.01) |
| F21K 99/00 | (2010.01) |
| F21V 5/04 | (2006.01) |
| G02B 19/00 | (2006.01) |
| F21V 5/08 | (2006.01) |
| F21Y 101/02 | (2006.01) |

(52) U.S. Cl.
CPC ... *F21V 5/04* (2013.01); *F21K 9/58* (2013.01); *F21V 5/043* (2013.01); *F21V 5/08* (2013.01); *G02B 19/0028* (2013.01); *G02B 19/0047* (2013.01); *F21Y 2101/02* (2013.01)

(58) Field of Classification Search
CPC ............. F21V 5/04; F21V 5/08; F21V 5/043; F21K 9/58; G02B 19/0047; G02B 19/0028
See application file for complete search history.

(56) References Cited

U.S. PATENT DOCUMENTS

| 2006/0198144 A1 | 9/2006 | Miyairi et al. |
| 2011/0141734 A1 | 6/2011 | Li et al. |

FOREIGN PATENT DOCUMENTS

| WO | 2011091259 A2 | 7/2011 |

OTHER PUBLICATIONS

International Search Report issued in the corresponding PCT application No. PCT/EP2012/067993, dated Dec. 21, 2012.

*Primary Examiner* — Joseph L Williams

(57) ABSTRACT

A lens for a linear light source may include a top and a bottom, the bottom including an incident surface, and a first supporting surface and a second supporting surface respectively at each side of the incident surface, and the top including an emergent surface, wherein the top further comprises a total internally reflective surface, and wherein in a cross section, the emergent surface is joined with the first supporting surface, the total internally reflective surface is joined with the second supporting surface, one part of light from the linear light source incidents into the incident surface and emerges after refracted by the emergent surface, and the other part of light incidents into the incident surface and reflected by the total internally reflective surface and then emerges after refracted by the emergent surface.

12 Claims, 3 Drawing Sheets

LENS AND AN ASYMMETRICAL LIGHT DISTRIBUTION ILLUMINATING DEVICE HAVING SUCH LENS

RELATED APPLICATIONS

The present application is a national stage entry according to 35 U.S.C. §371 of PCT application No.: PCT/EP2012/067993 filed on September 2013, 2012, which claims priority from Chinese application No.: 201110335752.X filed on Oct. 28, 2011, and is incorporated herein by reference in its entirety.

TECHNICAL FIELD

Various embodiments relate to a lens for a linear light source. In addition, various embodiments further relate to an asymmetrical light distribution illuminating device having such lens.

BACKGROUND

The asymmetrical light distribution luminaires are applied to various different fields, such as museum, trade fair stands, exhibitions, sales areas and promotional areas. Such luminaires are particularly for illuminating contents or articles exhibited but will not illuminate other areas, so that viewers can observe details of the exhibited contents or articles clearly. T5 fluorescent lamps are often used as a linear light source in current asymmetrical light distribution luminaires. Light from the T5 fluorescent lamp is offset to a predetermined direction via wallwasher reflectors fixed on the wall.

However, with the increased requirements on illumination and the enhanced consciousness of environmental protection and energy saving, people are willing to use the LED luminaires more and more as the light source, because the LED luminaires have a long service lifetime, a high light-emitting efficiency and low power consumption. But in the asymmetrical light distribution luminaires, when the linear light source made by the LED luminaire as the light source, the existing wallwasher reflectors can hardly create the asymmetrical light distribution effect produced by the common asymmetrical light distribution luminaires.

SUMMARY

Therefore, various embodiments provide a lens for a linear light source. Light from an LED light source can be asymmetrically distributed after passing through the lens so as to well illuminate the exhibited contents or articles particularly. In addition, the present disclosure further provides an asymmetrical light distribution illuminating device having such lens.

Various embodiments provide a lens for a linear light source. The lens includes a top and a bottom, wherein the bottom includes an incident surface, and a first supporting surface and a second supporting surface respectively at each side of the incident surface, and the top includes an emergent surface, wherein the top further includes a total internally reflective surface. In a cross section, the emergent surface is joined with the first supporting surface, the total internally reflective surface is joined with the second supporting surface, and one part of light from the linear light source incidents into the incident surface and emerges after refracted by the emergent surface, and the other part of light incidents into the incident surface and reflected by the total internally reflective surface and then emerges after refracted by the emergent surface. In the cross section, the lens according to various embodiments is asymmetrical, an emergent direction of one part of light from the linear light source after refracted by the incident surface and the emergent surface and an emergent direction of the other part of light after refracted by the incident surface to stroke the total internally reflective surface to be total internally reflected and refracted by the emergent surface may be offset over a predetermined angle with respect to an optical axis of the linear light source for asymmetrical illumination.

In various embodiments, the total internally reflective surface is formed to be inclined with respect to the optical axis of the linear light source, wherein an angle between a tangential direction of the total internally reflective surface and the bottom is bigger than 90°. As the total internally reflective surface is formed to be inclined with respect to the optical axis, light from the linear light source can be projected onto the total internally reflective surface at a relatively big angle after passing through the incident surface, and further the light can be reflected at a big emergent angle from the total internally reflective surface. As a result, the incident surface will not block light reflected, which greatly reduces the whole size of the lens.

In various embodiments, the incident surface includes a first incident surface portion and a second incident surface portion which define an accommodation cavity for accommodating the linear light source, wherein incidents into the first incident surface portion and emerges after refracted by the emergent surface, and the other part of light incidents into the second incident surface portion and reflected by the total internally reflective surface and then emerges after refracted by the emergent surface. As the linear light source is accommodated in the accommodation cavity formed jointly by the first incident surface portion and the second incident surface portion, all light from the linear light source enters the lens completely through the incident surface so that there is no light loss. Besides, light from the linear light source is divided, by the first incident surface portion and the second incident surface portion, into one part that can be directly refracted and offset and the other part that needs to be reflected and then refracted and offset, consequently, all light can be assured to be offset to a predetermined direction.

Preferably, the second incident surface portion is parallel to the optical axis. Accordingly, light from the linear light source can be projected onto the total internally reflective surface at an optimal incident angle, so as to assure the light emerging from the lens to be offset over a predetermined angle for asymmetrical illumination.

Further preferably, the second incident surface portion is formed to be inclined at 1-5° with respect to the optical axis in a direction away from the total internally reflective surface. In a precondition of assuring, as much as possible, light refracted by the second incident surface portion to be projected onto the total internally reflective surface at an optimal incident angle, the second incident surface portion is inclined at a certain angle with respect to the optical axis, which is favorable for demould of a mould from the lens during fabrication.

Further preferably, in a cross section, the first incident surface portion has a convex surface projecting towards the linear light source in a region adjacent to the second incident surface portion, and has a concave surface projecting away the direction of the linear light source in the other region, and the convex surface and the concave surface are in a smooth transition. Incident light may be offset to a predetermined angle by adjusting curve trends of respective portions of the incident surface. Of course, the convex surface and the concave surface also may be parabolic, conic or high-order curves. In this solution, the convex surface is rightly over the linear light source so as to serve the function of focusing light from the linear light source, which can better adjust the light distribution condition over the lens for more uniform distribution of light from the lens.

In various embodiments, the emergent surface includes a first emergent surface portion and a second emergent surface portion, wherein the one part of light incidents into the first incident surface portion and emerges after refracted by the first emergent surface portion, and the other part of light incidents into the second incident surface portion and reflected by the total internally reflective surface and then emerges after refracted by the second emergent surface portion. Preferably, the first emergent surface portion and the second emergent surface portion jointly form an arc-shape trend, wherein a circle center of the arc is a location where the linear light source is arranged. Likewise, the emergent light can be offset to a predetermined angle by adjusting curve trends of respective portions of the emergent surface.

Further preferably, the first emergent surface portion has an arc-shape trend, and the second emergent surface portion has a linear trend. Different parts of light can be particularly adjusted by configuring different emergent surface portions individually for different parts of light from the linear light source, so that the emergent light can achieve an optimal light distribution effect.

In various embodiments, the total internally reflective surface has a parabolic trend, which further improves the reflective effect of the total internally reflective surface so as to allow incident light to be completely reflected by the total internally reflective surface. Of course, the total internally reflective surface also may have a linear trend, which can simplify the technology of manufacturing the lens according to various embodiments.

In various embodiments, the lens is an extrusion lens extending in a direction parallel to an extending direction of the linear light source.

Various embodiments further provide an asymmetrical light distribution illuminating device having such lens. The illuminating device uses an LED linear light source, and offsets light from the LED linear light source to a predetermined angle with the lens of the present disclosure to realize an asymmetrical light distribution for better illuminating contents or articles exhibited particularly.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
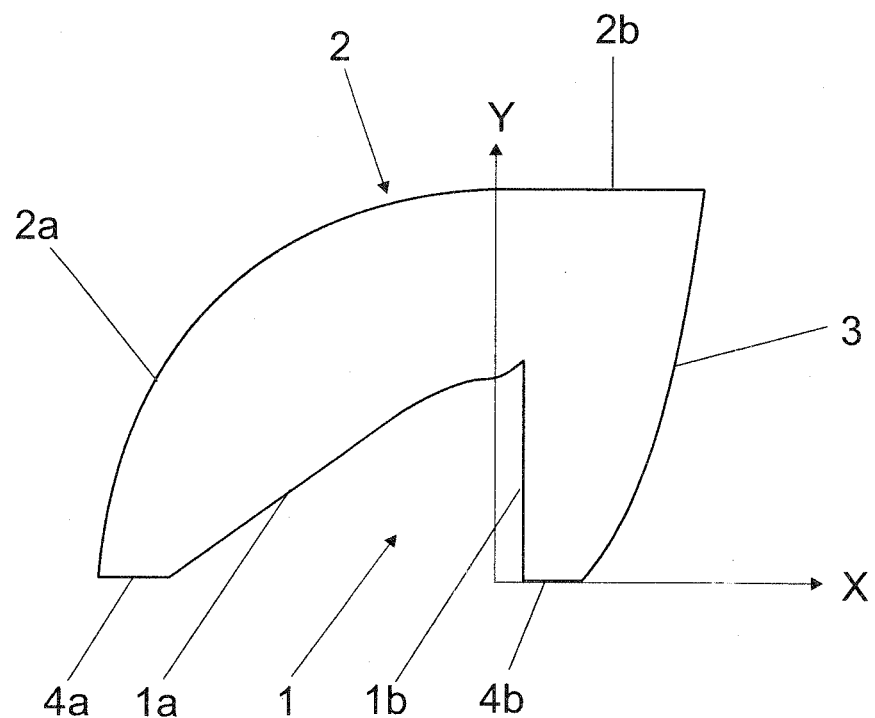
FIG. 1 is a sectional view of a lens of one embodiment of the present disclosure.

FIG. 1 is a sectional view of a lens of one embodiment of the present disclosure. As can be seen from FIG. 1, the lens according to the present disclosure comprises a top and a bottom, wherein the bottom comprises an incident surface 1, and a first supporting surface 4a and a second supporting surface 4b respectively at each side of the incident surface 1, and the top comprises an emergent surface 2. The top further comprises a total internally reflective surface 3, wherein in a cross section, the emergent surface 2 is joined with the first supporting surface 4a, the total internally reflective surface 3 is joined with the second supporting surface 4b, and one part of light from the linear light source incidents into the incident surface 1 and emerges after refracted by the emergent surface 2, and the other part of light incidents into the incident surface 1 and reflected by the total internally reflective surface 3 and then emerges after refracted by the emergent surface 2. It can be seen further from FIG. 1 that the incident surface 1 comprises a first incident surface portion 1a and a second incident surface portion 1b which define an accommodation cavity for accommodating the linear light source. In the present embodiment, the first incident surface portion 1a has a convex surface projecting towards the linear light source in a region adjacent to the second incident surface portion 1b, and has a concave surface projecting away the direction of the linear light source in the other region, and the convex surface and the concave surface are in a smooth transition. In a preferred solution of the present disclosure, a curve trend of the first incident surface portion 1a may be obtained from formula (1) $Y-0.5=1-X^2$, and a curve trend of the second incident surface 1b may be obtained from formula (2) $Y-1.5=X^2$, wherein X and Y are transverse axis and longitudinal axis (optical axis Y of the linear light source) of a coordinate system. In the present embodiment, the second incident surface portion 1b is formed to be parallel to the optical axis Y. Of course, the second incident surface portion 1b also may be formed to be inclined at a certain angle, for instance, 1-5°, with respect to the optical axis Y in a direction away from the total internally reflective surface 3.

Besides, it can be seen further from FIG. 1 that the emergent surface 2 comprises a first emergent surface portion 2a and a second emergent surface portion 2b. In conjunction with the optical pathway diagram shown in FIG. 3, one part of light emerges after refracted by the first incident surface portion 1a and the first emergent surface portion 2a, and the other part of light is refracted by the second incident surface portion 1b to the total internally reflective surface 3 to be total internally reflected and emerges after refracted by the second emergent surface portion 2b. In the present embodiment, the first emergent surface portion 2a is in an arc-shape, and the second emergent surface portion 2b is in a linear shape. An origin of the arc is a location where the linear light source is arranged. Of course, a curve profile of the emergent surface is not limited to the above form, and the first emergent surface portion 2a and the second emergent surface portion 2b also may jointly form an arc-shape.

As further seen from FIG. 1, the total internally reflective surface 3 is formed to be inclined with respect to the optical axis Y of the linear light source, wherein an angle between a tangential direction of the total internally reflective surface 3 and the bottom is bigger than 90°. In the present embodiment, the total internally reflective surface 3 is in a parabolic shape. Of course, the total internally reflective surface 3 also may be a linear shape.

Figure 2:
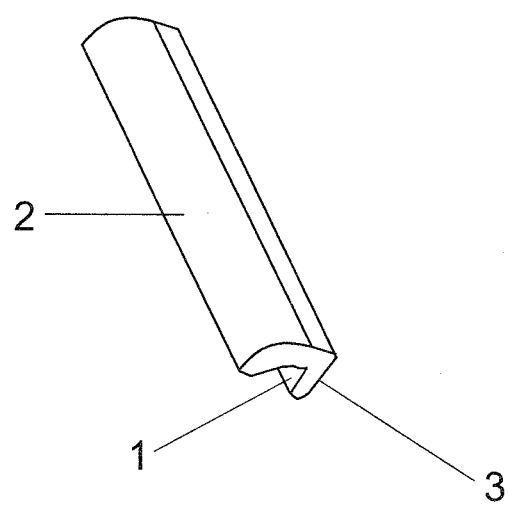
FIG. 2 is a 3D view of the lens according to the present disclosure.

FIG. 2 is a 3D view of the lens according to the present disclosure. As can be seen from FIG. 2, the lens is an extrusion lens extending in a direction parallel to an extending direction of the linear light source.

Figure 3:
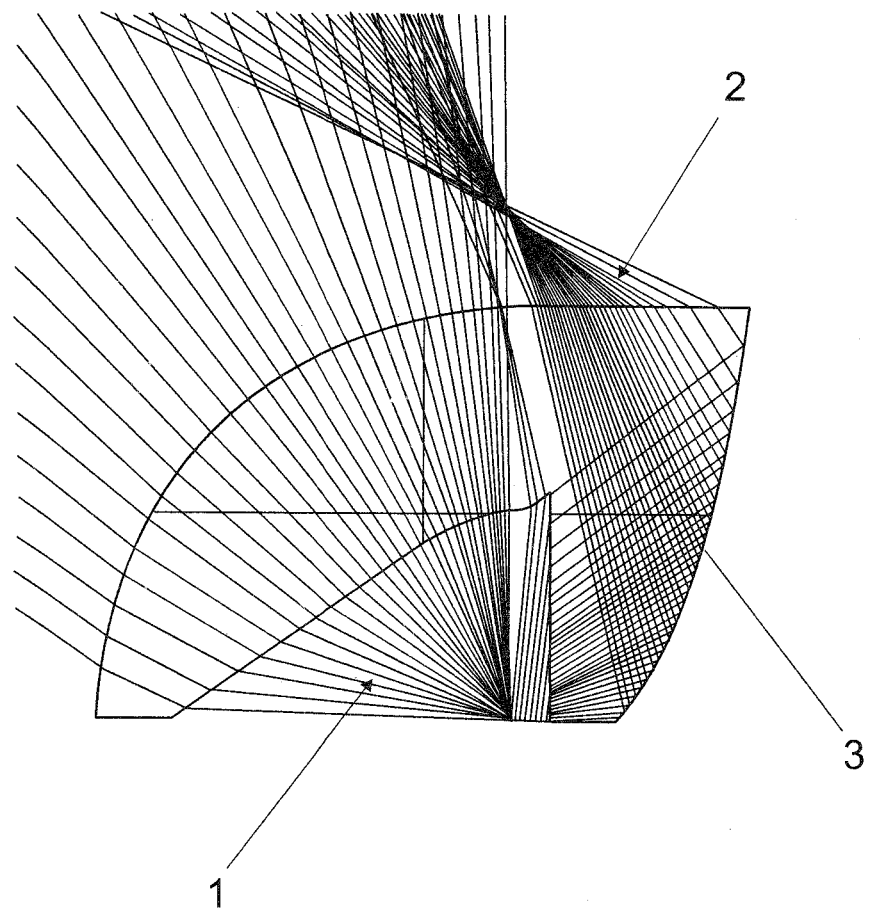
FIG. 3 is an optical pathway diagram of the lens according to the present disclosure.

FIG. 3 is an optical pathway diagram of the lens according to the present disclosure. As can be seen from FIG. 3, light from the linear light source is divided into two parts, wherein one part of light emerges after refracted by the first incident surface portion 1a and the first emergent surface portion 2a, and the other part of light is refracted by the second incident surface portion 1b to the total internally reflective surface 3 to be total internally reflected and emerges after refracted by the second emergent surface portion 2b. The two parts of light is offset to one side of the lens for an asymmetrical light distribution.

Figure 4:
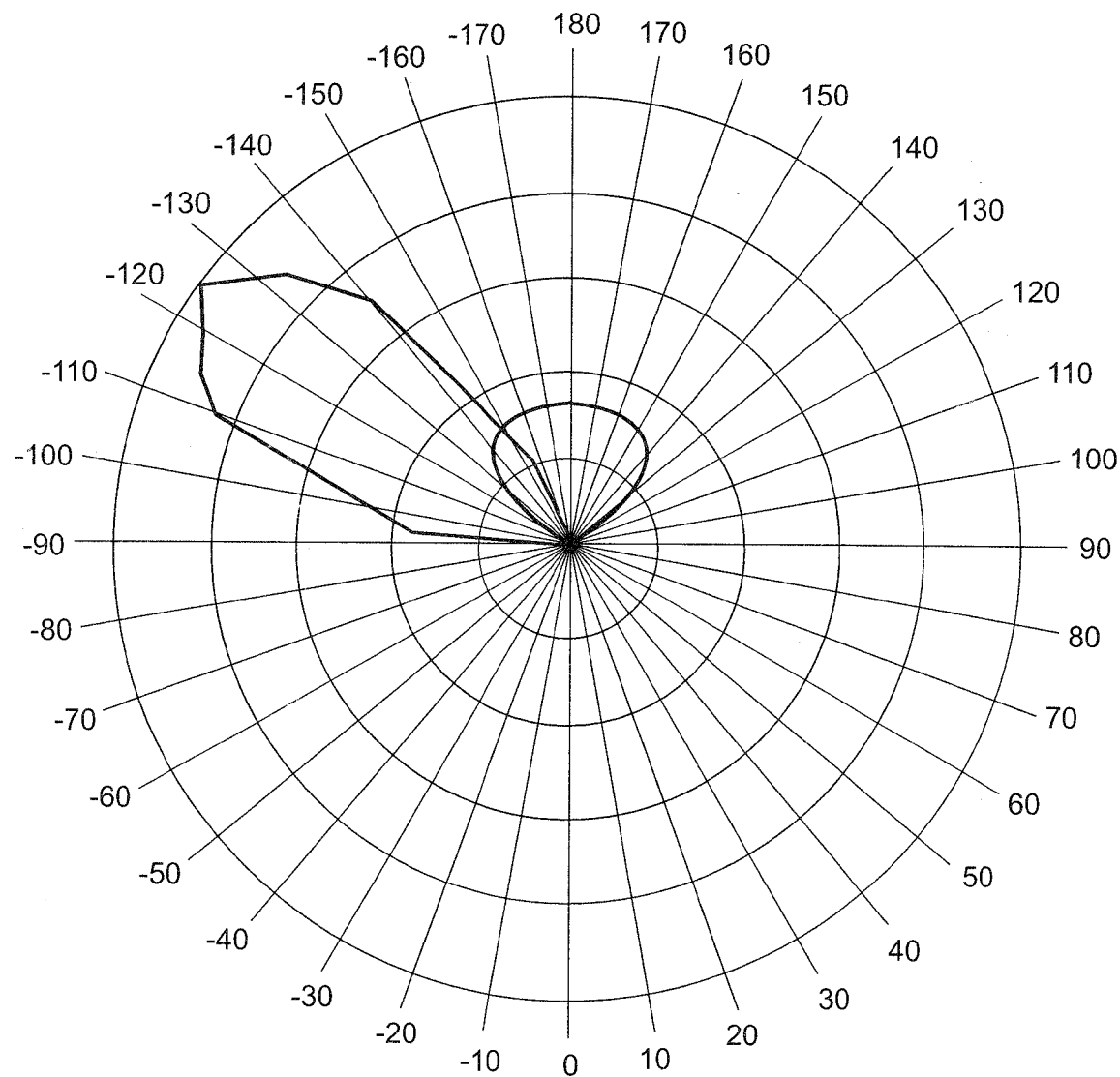
FIG. 4 is a light distribution map of the lens according to the present disclosure.

FIG. 4 is a light distribution map of the lens according to the present disclosure. As can be seen from FIG. 4, an asymmetrical light distribution effect is obtained through application of the lens according to the present disclosure, which is quite similar to the light distribution effect created by the prior asymmetrical light distribution luminaires.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS 1 incident surface
1a first incident surface portion
1b second incident surface portion
2 emergent surface
2a first emergent surface portion
2b second emergent surface portion
3 total internally reflective surface
4a first supporting surface
4b second supporting surface
Y optical axis (longitudinal axis)
X transverse axis

The invention claimed is:

1. A lens for a linear light source comprising
a top and a bottom, the bottom comprising an incident surface, and a first supporting surface and a second supporting surface respectively at each side of the incident surface, and the top comprising an emergent surface,
wherein the top further comprises a total internally reflective surface, and
wherein in a cross section, the emergent surface is joined with the first supporting surface, the total internally reflective surface is joined with the second supporting surface, one part of light from the linear light source incidents into the incident surface and emerges after refracted by the emergent surface, and the other part of light incidents into the incident surface and reflected by the total internally reflective surface and then emerges after refracted by the emergent surface,
wherein in the cross section, the total internally reflective surface is formed to be inclined with respect to an optical axis of the linear light source, and wherein an angle between a tangential direction of the total internally reflective surface and the bottom is bigger than 90°.

2. The lens according to claim 1, wherein the total internally reflective surface is in a linear shape.

3. The lens according to claim 1, wherein the lens is an extrusion lens extending in a direction parallel to an extending direction of the linear light source.

4. A lens for a linear light source comprising
a top and a bottom, the bottom comprising an incident surface, and a first supporting surface and a second supporting surface respectively at each side of the incident surface, and the top comprising an emergent surface,
wherein the top further comprises a total internally reflective surface, and
wherein in a cross section, the emergent surface is joined with the first supporting surface, the total internally reflective surface is joined with the second supporting surface, one part of light from the linear light source incidents into the incident surface and emerges after refracted by the emergent surface, and the other cart of light incidents into the incident surface and reflected b the total internally reflective surface and then emerges after refracted by the emergent surface,
wherein the incident surface comprises a first incident surface portion and a second incident surface portion which define an accommodation cavity for accommodating the linear light source, and wherein the one part of light incidents into the first incident surface portion and emerges after refracted by the emergent surface, and the other part of light incidents into the second incident surface portion and reflected by the total internally reflective surface and then emerges after refracted by the emergent surface.

5. The lens according to claim 4, wherein the second incident surface portion is parallel to the optical axis.

6. The lens according to claim 4, wherein the second incident surface portion is formed to be inclined at 1-5° with respect to the optical axis in a direction away from the total internally reflective surface.

7. The lens according to claim 4, wherein in the cross section, the first incident surface portion includes a convex surface projecting towards the linear light source adjacent to the second incident surface portion, and a concave surface recessed away the linear light source, and the convex surface and the concave surface are in a smooth transition.

8. The lens according to claim 4, wherein the emergent surface comprises a first emergent surface portion and a second emergent surface portion, and wherein the one part of light incidents into the first incident surface portion and emerges after refracted by the first emergent surface portion, and the other part of light incidents into the second incident surface portion and reflected by the total internally reflective surface and then emerges after refracted by the second emergent surface portion.

9. The lens according to claim 8, wherein in the cross section, the first emergent surface portion and the second emergent surface portion jointly form an arc-shape.

10. The lens according to claim 8, wherein in the cross section, the first emergent surface portion is in an arc-shape, and the second emergent surface portion is in a linear shape.

11. A lens for a linear light source comprising
a top and a bottom, the bottom comprising an incident surface and a first supporting surface and a second supporting surface respectively at each side of the incident surface, and the top comprising an emergent surface,
wherein the top further comprises a total internally reflective surface, and
wherein in a cross section, the emergent surface is joined with the first supporting surface, the total internally reflective surface is joined with the second supporting surface, one part of light from the linear light source incidents into the incident surface and emerges after refracted by the emergent surface, and the other part of light incidents into the incident surface and reflected by the total internally reflective surface and then emerges after refracted by the emergent surface, wherein in the cross section, the total internally reflective surface is in a parabolic shape.

12. A lens for a linear light source comprising
   a top and a bottom, the bottom comprising an incident surface, and a first supporting surface and a second supporting surface respectively at each side of the incident surface, and the top comprising an emergent surface,
wherein the top further comprises a total internally reflective surface, and
wherein in a cross section, the emergent surface is directly with the first supporting surface, the total internally reflective surface is joined with the second supporting surface, one part of light from the linear light source incidents into the incident surface and emerges after refracted by the emergent surface, and the other part of light incidents into the incident surface and reflected by the total internally reflective surface and then emerges after refracted by the emergent surface.

* * * * *

UNITED STATES PATENT AND TRADEMARK OFFICE
CERTIFICATE OF CORRECTION

PATENT NO. : 9,212,804 B2  
APPLICATION NO. : 14/354599  
DATED : December 15, 2015  
INVENTOR(S) : Qihui Zhang et al.

Page 1 of 1

It is certified that error appears in the above-identified patent and that said Letters Patent is hereby corrected as shown below:

IN THE CLAIMS

Column 6, line 14: Please delete the word "cart" between the words "other" and "of", and write the word "part" in place thereof.

Column 6, line 15: Please delete the letter "b" between the words "reflected" and "the", and write the word "by" in place thereof.

Column 6, line 55: Please place a "," between the first word of the line "surface" and the second word of the line "and".

Column 7, line 10: Please write the word "joined" between the last word of the line 10 "directly" and the first word of the line 11 "with".

Signed and Sealed this  
Twelfth Day of April, 2016

Michelle K. Lee  
*Director of the United States Patent and Trademark Office*